(12) United States Patent
Doi

(10) Patent No.: US 6,603,821 B1
(45) Date of Patent: Aug. 5, 2003

(54) WIRELESS COMMUNICATION TERMINAL CAPABLE OF CORRECTLY SPECIFYING POSITION OF BURST AND HAVING SMALL FREQUENCY ERROR OF RECOVERED CARRIER

(75) Inventor: Masayuki Doi, Hyogo (JP)

(73) Assignee: Mitsubishi Denki Kabushiki Kaisha (JP)

( * ) Notice: Subject to any disclaimer, the term of this patent is extended or adjusted under 35 U.S.C. 154(b) by 0 days.

(21) Appl. No.: 09/477,416

(22) Filed: Jan. 4, 2000

(30) Foreign Application Priority Data

Nov. 12, 1999 (WO) .................................. PCT/JP99/6311

(51) Int. Cl.[7] .................. H04L 27/14; H04L 27/16; H04L 27/22
(52) U.S. Cl. .................. 375/326; 375/320; 375/340; 375/344
(58) Field of Search ............................... 375/326, 316, 375/320, 322, 324, 325, 340, 342, 344, 261, 268, 271, 362; 455/75

(56) References Cited

U.S. PATENT DOCUMENTS

| 5,276,710 A | * | 1/1994 | Iwasaki | ................. | 375/340 |
| 5,291,081 A | * | 3/1994 | Takeuchi et al. | ................. | 327/47 |
| 5,563,914 A |   | 10/1996 | Sogabe | | |
| 5,684,836 A |   | 11/1997 | Nagayasu et al. | | |
| 6,016,329 A | * | 1/2000 | Iwasaki | ................. | 375/340 |
| 6,498,822 B1 | * | 12/2002 | Tanaka | ................. | 375/354 |

FOREIGN PATENT DOCUMENTS

| JP | 7-87149 | 3/1995 |
| JP | 8228208 | 9/1996 |

OTHER PUBLICATIONS

H. Kubo et al., "A Multiple Open–Loop AFC for MPSK", Technical Report of IEICE, Sane 95–114, Sat 95–92, Feb., 1996, pp. 25–32.

* cited by examiner

Primary Examiner—Jean Corrielus
(74) Attorney, Agent, or Firm—Rothwell, Figg, Ernst & Manbeck, p.c.

(57) ABSTRACT

A power calculator calculates the power of an input signal in accordance with a component of an input received signal. A comparator asserts an unmodulated signal detection signal when the power calculated by the power calculator exceeds a prescribed threshold. A maximum value detector detects the maximum power of the input received signal in accordance with the assertion of the unmodulated signal detection signal and generates non-modulated signal position instruction information with a maximum value detection signal, and a frequency error calculator calculates an error of a carrier frequency on the basis of the received signal corresponding to the maximum power. The frequency error is calculated only with a non-modulated signal, whereby the frequency error can be correctly calculated and the non-modulated signal position can also be correctly detected.

12 Claims, 9 Drawing Sheets

(a) NOISE (b) CARRIER (c) DATA

DISTRIBUTION OF P(Z)

WIRELESS COMMUNICATION TERMINAL CAPABLE OF CORRECTLY SPECIFYING POSITION OF BURST AND HAVING SMALL FREQUENCY ERROR OF RECOVERED CARRIER

BACKGROUND OF THE INVENTION

1. Field of the Invention

The present invention relates to a wireless communication terminal for performing communication in a system for mobile communication, satellite communication or mobile satellite communication. More specifically, the present invention relates to a frequency error estimator in a demodulator for recovering a received signal.

2. Description of the Background Art

Following the recent development of wireless communication, mobile communication, satellite communication and mobile satellite communication are widely utilized. Such communication is performed through a communication system such as an FDMA (frequency division multiple access) system or a TDMA (time division multiple access) system. In such a transmission system, data are transmitted in units referred to as bursts. In each of an SCPC (single carrier per channel) system in the FDMA system and the TDMA system, an unmodulated part for recovering a carrier, for example, is transmitted for correcting frequency deviation of a transmitted signal resulting from a Doppler effect or the like and performing synchronized recovering.

FIG. 1 illustrates an exemplary structure of a burst employed for data transmission. Referring to FIG. 1, the burst includes a carrier recovering code CR (carrier recovery), a clock recovering code STR (symbol timing recovery), a unique word UW and a data part DATA. A silent part by voice activation in the SCPC system or a silent part GT of a guard time in the TDMA system is arranged outside this burst.

The data part DATA may include a synchronizing control signal and a line control signal.

The carrier recovering code CR, which is formed by an unmodulated carrier, has a pattern "11" or "00". The clock recovering code STR is obtained by modulating a carrier in accordance with a clock signal. The unique word UW, which is an identification code indicating that the burst starts from this position, is a modulation code having a known pattern. The data part DATA, the structure of which varies with the structure (reference burst/data burst) of this burst and a line connection system, includes at least data necessary for line connection.

Carrier recovering is performed on a received wave of a burst form using the carrier recovering code CR which is an unmodulated signal, and clock recovering is performed with the clock recovering code STR for recovering the received signal.

Communication data is transmitted while modulating a carrier with the data. A receiver must demodulate the received modulated signal. The demodulation system includes an FSK (frequency shift keying) system, a PSK (phase shift keying) system and the like. Consider a QPSK system as a representative demodulation system, in order to simplify the description.

Transmission data are divided into pairs of bits to be transmitted. A 2-bit pair represents one of four states (11), (01), (00) and (10). These four states (11), (01), (00) and (10) are assigned to phases $\pi/4$, $3\pi/4$, $5\pi/4$ and $7\pi/4$ and modulated. In this QPSK system, one of two bits of data is multiplied by a carrier and the other is multiplied by a signal obtained by phase-shifting the carrier by $\pi/2$. These signals are referred to as an I-channel signal and a Q-channel signal, respectively. The I-channel signal and the Q-channel signal are added up and then transmitted. In relation to this QPSK system, consider a $\pi/4$ shift QPSK system having eight modulated states and limiting modulated states for subsequent transition to $\pm\pi/4$ and $\pm3\pi/4$.

FIG. 2 shows the positions of the modulated states of the $\pi/4$ shift QPSK system. Referring to FIG. 2, states P0 to P7 are arranged out of phase by $\pi/4$ from each other. State transition is limited to $\pm\pi/4$ and $\pm3\pi/4$, and hence the state P0 can be shifted to one of only the four states P1, P3, P5 and P7, for example. In this $\pi/4$ shift QPSK system, band limitation is simple since state transition is made without passing the origin while no excessive sideband is caused since fluctuation of the envelope is small, whereby communication of a number of stations can be made at channel intervals.

In this wireless communication terminal, it is necessary to estimate a frequency error caused by drift of a local oscillator or the like for eliminating this frequency error and sampling received data thereby correctly recovering the received data. Therefore, a demodulator is provided with a frequency error estimator. In relation to such a frequency error estimator, a single-symbol delay detection frequency error estimator and a multi-symbol delay detection frequency error estimator are proposed. In TECHNICAL REPORT OF IEICE, SANE 95-114, SAT95-92 (February 1996), for example, Kubo et al. describe a multiple circuit AFC as a multi-symbol delay detection frequency error estimator in an article titled "A Multiple Open-Loop AFC for MPSK".

FIG. 3 schematically illustrates the structure of a conventional single-symbol delay detection frequency error estimator. Referring to FIG. 3, the conventional one-symbol delay detection frequency error estimator includes a phase converter 13 receiving an I-channel signal supplied to an input terminal 11 and a Q-channel signal supplied to an input terminal 12 and detecting the phase of a received QPSK modulated signal from the I-channel signal and the Q-channel signal, a single-symbol delay detector 15 obtaining the difference between phase information output from the phase converter 13 and phase information preceding by one symbol and extracting phase difference information, an orthogonal transformer 16 generating I-channel data and Q-channel data in accordance with the phase difference information from the single-symbol delay detector 15, moving average filters 17 and 18 obtaining moving averages of the I-channel data and the Q-channel data from the orthogonal transformer 16 respectively, a power calculator 19 calculating the power of the received signal in accordance with output components from moving average filters 17 and 18, a comparator 20 comparing the power output from power calculator 19 with a predetermined threshold, and a frequency error calculator 21 activated in response to activation of an unmodulated signal detection signal CRDT from comparator 20 for generating a frequency error, EFER from the I-channel component and the Q-channel component from moving average filters 17 and 18.

The unmodulated signal detection signal CRDT from comparator 20 is supplied to a synchronization establish circuit through an output terminal 23, while the estimated frequency error signal EFER from frequency error calculator 22 is supplied to a voltage control oscillator (VCO) generating a recovered carrier signal through a terminal 22.

Operations of the frequency error estimator shown in FIG. 3 are now described.

In order to simplify the description, it is assumed that the received signal (IQ signal) is a signal demodulated in accordance with the π/4 shift QPSK system. General description is provided later. In this case, two-bit symbol data are differentially encoded. In this differential encoding, the following phase information is differentially encoded and transmitted:

$$\phi'(n)=\phi'(n-1)+\phi(n) \quad (1),$$

where $\phi'(n)$ and $\phi'(n-1)$ represent the phase of a currently transmitted symbol, the phase of a signal transmitted precedently by one symbol, and $\phi(n)$ represents a phase corresponding to the data to be transmitted. In the π/4 shift QPSK system, the phase $\phi(n)$ is either one of ±π/4 and ±3π/4.

Phase converter 13 receives an I-channel component and a Q-channel component supplied to input terminals 11 and 12 respectively and detects the their phases. A received signal Sd(t) is expressed as follows:

$$Sd(t) = I + j \cdot Q$$
$$= ext\{j(2\pi \cdot fc \cdot t + \phi')\},$$

where fc represents the frequency of the carrier and $\phi'$ represents the phase of the received IQ signal.

$$Q/I=\tan^{-1}(2\pi \cdot fc \cdot t+\phi')$$

The difference between the current symbol and the previous symbol is obtained in transmission. When setting a symbol rate and a carrier frequency so that fc·t is a multiple of an integer in the above equation, therefore, the above equation is reduced as follows:

$$Q/I=\tan^{-1}(\phi').$$

Hence, the phase (phase difference) $\phi'$ is obtained by obtaining the inverse tangent (arc tangent) of the component values of the I-channel signal and the Q-channel signal by phase converter 13.

Single-symbol delay detector 15 includes a single-symbol delayer 15a delaying the phase information from phase converter 13 by one symbol period and a subtracter (adder) 15b subtracting phase information output from single-symbol delayer 15a from the phase information output from phase converter 13. Therefore, single-symbol delay detector 15 outputs the following phase information:

$$\phi'(n)-\phi'(n-1)=\phi'(n-1)+\phi(n)-\phi'(n-1)=\phi(n)$$

Thus, the phase of the received data can be detected with the output from single-symbol delay detector 15.

In the π/4 shift QPSK system, the following equation holds:

$$\phi'(n)=\phi'(n-1)+\phi(n)$$

$\phi(n)$ is either one of ±π/4 and ±3π/4.

The phases of combinations (π/4, 3π/4, −3π/4, −π/4) and (0, π/2, π, −π/4) alternately appear in the transmission phase $\phi(n)$.

Therefore, the I-channel component and the Q-channel component can be derived from this phase difference $\phi(n)$.

In accordance with the phase $\phi(n)$ output from single-symbol delay detector 15, the orthogonal transformer 16 detects the I-channel data and the Q-channel data. As shown in FIG. 5, the phase differences π/4, 3π/4, −3π/4 and −π/4 correspond to data, respectively. The I-channel data and the Q-channel data may be calculated through utilizing the equality of the tangent of the phase difference $\phi(n)$ to Q/I (by utilizing a table memory, for example).

In differential encoding of the general QPSK system, detected phase differences are 0, ±π/2 and π, and each phase difference is related to a symbol when no frequency error occurs.

Moving average filters 17 and 18 obtain averages of the I-channel data and the Q-channel data from orthogonal transformer 16 over prescribed symbols and eliminate harmonic components. The moving average filters 17 and 18 execute filter processing expressed in the following equations:

$$Ifout=\Sigma I(n-j)/L,$$

$$Qfout=\Sigma Q(n-j)/L,$$

where Ifout and Qfout represent the output data from moving average filters 17 and 18. The summation is performed over j=0–(L−1). The tap number (L−1) of moving average filters 17 and 18 is set on the basis of a symbol number L of an unmodulated signal area, i.e., the carrier recovering code CR.

A total sum calculator 19 calculates the sum of squares of the I-channel data Ifout and the Q-channel data Qfout output from moving average filters 17 and 18. The power of the signal Sd(t) is obtained by the sum of squares of the I-channel data Ifout and the Q-channel data Qfout from the relation that the transmitted signal Sd(t) is equal to I+j·Q.

The comparator 20 compares the power calculated by power calculator 19 with the predetermined threshold and determines presence/absence of an unmodulated signal on the basis of the result of comparison. Assuming that PMAX represents power obtained when the moving average filters 17 and 18 are filled with a result of delay detection of the unmodulated signal in a noiseless state, α·MAX is selected as the threshold. The coefficient α represents tolerance set depending on transmission path conditions etc.

When the unmodulated signal detection signal CRDT from comparator 20 is activated and a determination is made that the unmodulated signal is received, the frequency error calculator 21 calculates an average frequency error of one symbol from the I-channel data Ifout and the Q-channel data Qfout from moving average filters 17 and 18. It is assumed that fc·t is an integer in the term of 2·π·fc·t in the aforementioned encoding. If an input QPSK modulated wave has a carrier frequency error ΔF, therefore, the input modulated wave Sd(t) is expressed as follows:

$$Sd(t)=\exp[j\{2\pi \cdot \Delta F \cdot t+\phi'(t)\}],$$

where t represents a discrete time expressed as n·T and T represents the symbol cycle.

In the structure shown in FIG. 3, the phase converter 13 obtains the phase of the input modulated signal from the input modulated signals (the I-channel signal and the Q-channel signal). When the input modulated wave has the carrier frequency error ΔF, the phase converter 13 also detects the frequency error ΔF and this frequency error component is supplied to single-symbol delay detector 15. At this time, the following phase error results from the frequency error for the current phase component:

$$2\pi \cdot \Delta F \cdot T=2\pi \cdot \Delta F \cdot T/Fs.$$

The single-symbol delay detector 15 performs one-symbol delay and hence the phase component error is $2 \cdot \pi \Delta F \cdot 1/Fs$. The orthogonal transformer 16 calculates the I-channel data and the Q-channel data inclusive of the phase error component resulting from the frequency error, and hence the I-channel component Ifout and the Q-channel component Qfout from moving average filters 17 and 18 also include errors resulting from the frequency error.

Therefore, the frequency error calculator 21 performs arc tangent operation, in order to calculate the phase information $\phi$ from the I-channel component Ifout and the Q-channel component Qfout. Thus, phase information in the unmodulated signal area is obtained.

The carrier recovering code CR, which is a unmodulated signal and the carrier itself, has the pattern (symbol) 11 or 00 and regularly remains at the same shift phase quantity, and a symbol-to-symbol phase difference there of can be regarded as zero. In this case, therefore, the phase difference, i.e., the phase information $\phi$ results from the frequency error $\Delta F$. Hence, the frequency error $\Delta F$ is expressed as follows:

$$\Delta F = (1/2\pi \cdot T) \cdot \phi$$
$$= (Fs/2\pi) \cdot \tan^{-1}(Qfout/Ifout)$$

Thus, the frequency error can be obtained through the unmodulated signal. In accordance with the detected frequency error EFER, an oscillation frequency is so controlled that an oscillation signal from a local oscillator generating a reference frequency signal for sampling and recovering the input signal is synchronized with the carrier. Phase synchronization of a sampling clock signal is established with the symbol timing recovering code STR, for executing sampling and recovery of data included in the data part.

Operations of the frequency error estimator are now generally described. When the received signal is a continuous wave and frequency deviation is caused, the phase regularly rotates in one direction. Consider that a received signal (In, Qn) has a phase $\theta(n)$ and a next received signal component (In+1, Qn+1) has a phase difference $\Delta\theta(n+1)$ with respect to the received component (In, Qn) as shown in FIG. 4. In this case, the phase converter 13 first calculates the phase components $\theta(n)$ and $\theta(n+1)$ simply by arc tangent operation. The single-symbol delay detector 15 generates the following phase difference component:

$$\Delta\theta(n+1)=\theta(n+1)-\theta(n).$$

In other words, arc tangent operation is simply performed on an input received sample signal. No data value of the received signal component is taken into consideration. In this case, the orthogonal transformer 16 performs tangent operation of the phase difference $\Delta\theta(n+1)$ and generates an I-channel component and a Q-channel component.

In other words, the orthogonal transformer 16 obtains $\cos(\Delta\theta(n))$ and $\sin(\Delta\theta(n))$ as the I-channel component and the Q-channel component respectively, as shown in FIG. 4.

Therefore, the moving average filters 17 and 18 perform the following calculations:

$$Ifout(n)=\Sigma\cos\Delta\theta(n-j)$$
$$Qfout(n)=\Sigma\sin\Delta\theta(n-j)$$

The summation is performed as to j=0–L–1. If n–j<0, it is assumed that $\Delta\theta(n-j)=0$. Thus, a moving average of L stages is obtained.

The power calculator 19 obtains power P(z) of filter outputs shown in FIG. 5 from the outputs Ifout(n) and Qfout(n) of moving average filters 17 and 18 as follows:

$$P(z(n))=Ifout(n)^2+Qfout(n)^2.$$

When the phase difference $\Delta\theta$ is distributed only in one direction, change of the envelope is small and hence the power P(z(n)) is maximized. When a modulated component is included, the direction of change thereof varies with data as described above with reference to the $\pi/4$ shift QPSK system, and hence the phase difference $\Delta\theta$ change in positive and negative directions. In this case, therefore, the envelope remarkably changes and the power P(z(n)) is reduced.

The frequency error calculator 21 calculates the average frequency error $\Delta F$ of one symbol in accordance with the equation $\Delta\theta=\tan^{-1}(Qfout(n)/Ifout(n))$. This phase difference $\Delta\theta$ is related to the average frequency error $\Delta F$ as follows:

$$\Delta F = \Delta\theta/(2\pi \cdot T)$$
$$= (Fs/2\pi) \cdot \tan^{-1}(Qfout/Ifout).$$

Thus, the frequency error $\Delta F$ can be calculated similarly to the above equation. In this case, however, it is assumed that the symbol-to-symbol phase difference results from the frequency error. It is assumed that the unmodulated signal component is repetition of the same pattern and the phase error results from frequency deviation.

When the unmodulated signal (carrier recovering code CR) is formed by L symbols as shown in FIG. 6, the window of the moving average filter is an L-symbol interval. Consider the power of the carrier recovering code CR (unmodulated signal part), the noise part and the data part. When the unmodulated signal is a carrier, the input signal Sd(t) is expressed as follows, as described above:

$$Sd(t)=\exp(j \cdot 2\pi \cdot \Delta F \cdot t)+k(t),$$

where k(t) represents a noise component.

On the basis of the phase component $2\pi \cdot \Delta F \cdot 1/Fs$, the power calculator 19 obtains the sum of squares of the respective components. In this case, therefore, the power P(z) of the sum of the squares for a single input signal is higher than a certain reference value since the phase regularly rotates only in one direction in the case of the carrier.

When only the noise component is present, the input signal has only the noise component k(t). In this case, therefore, no frequency error component contributes as compared with the carrier component while the phase changes at random in positive and negative directions, and hence the square sum P(z) of the I-channel component and the Q-channel component of the noise is sufficiently smaller than the comparing reference value.

The data part is a modulated signal component, and the symbol recovering code, the unique word and the data part can be regarded as pseudo noise (PN). Also in the case of the data part, therefore, the phase changes substantially at random in the positive and negative directions similarly to the noise and hence the power thereof is sufficiently smaller than the threshold. In the data part, the received signal Sd(t) is expressed as follows:

$$Sd(t)=\exp\{j(2\cdot\pi\Delta F \cdot t+D)\}+k(t),$$

where D represents a random variable indicating phase modulation.

Therefore, whether or not an unmodulated signal, i.e., a carrier arrives and whether or not a burst is input can be determined by comparing the output value P(z) of power calculator 19 with the threshold.

As described above, however, each of moving average filters 17 and 18 obtains the moving average of L symbols.

When moving average filters 17 and 18 store all L symbols of the unmodulated signal, i.e., the carrier recovering code CR, therefore, the output values of moving average filters 17 and 18 are maximized.

Consider that comparator 20 has thresholds A and B as shown in FIG. 8 (the threshold A is greater than the threshold B). In this case, the moving average filters 17 and 18 perform moving average processing on signal components in a modulated signal area 31 (this area may include a noise component or data of a preceding burst) preceding an unmodulated signal (carrier) (carrier recovering code CR) included in an unmodulated signal area 32. As described above, the power in the unmodulated signal area 32 is higher than that of the data and noise parts. In moving average processing in moving average filters 17 and 18, therefore, the power of the output values of moving average filters 17 and 18 increases as the ratio of unmodulated signal area 32 increases. The unmodulated signal detection signal CRDT is asserted at a time ta in the case of the threshold B while the unmodulated signal detection signal CRDT is asserted at a time tb in the case of the threshold A. Thus, the assert timing for the unmodulated signal detection signal CRDT varies with the levels of the thresholds.

Both of the thresholds A and B are rendered smaller than the power PMAX obtained through moving average processing on all L symbols included in the unmodulated signal area 32 in practice, in consideration of transmission path loss or the like. Upon estimating an average frequency error of one symbol inclusive of a modulated signal, therefore, the number of unmodulated signal components averaged in moving average filters 17 and 18 is reduced and hence estimation precision of the frequency error estimated in frequency error calculator 21 is disadvantageously deteriorated.

When the sum of the squares of the I-channel component Ifout and the Q-channel component Qfout from moving average filters 17 and 18 exceeds the prescribed threshold, the unmodulated signal is determined to be present, and the frequency error is calculated. In this case, therefore, the position of the burst cannot be specified although presence/absence of the burst can be determined and the position for starting synchronization establishment of the symbol and sampling cannot be correctly specified.

Further, detection precision for the frequency error also remarkably depends on the set value of the threshold, and hence it is difficult to correctly set the threshold in consideration of factors such as loss on the transmission path varying with the situation of usage, and the frequency error cannot be regularly correctly estimated.

The aforementioned problems arise in a demodulator employed in a communication system transmitting data not only in the modulation system such as the π/4 shift QPSK system but also in a modulation system such as the FSK system or a general QPSK system. In other words, the problems regularly arise in a demodulator for correcting deviation of a carrier frequency with an unmodulated signal (carrier) included in a burst employed in data communication.

SUMMARY OF THE INVENTION

An object of the present invention is to provide a wireless communication terminal capable of calculating a frequency error in high precision and correctly specifying the position of a burst.

Another object of the present invention is to provide a wireless communication terminal capable of correctly detecting an unmodulated signal area and specifying the position thereof regardless of the level of a threshold providing the detection reference for an unmodulated signal.

Briefly stated, the wireless communication terminal according to the present invention detects the maximum value of the power of an input signal over a predetermined time interval after the power exceeds a threshold. The wireless communication terminal also estimates a frequency error, using I and Q channel components providing the maximum value of the power. The wireless communication terminal asserts an unmodulated signal detection signal in accordance with detection of the maximum value.

It is possible to specify a position where moving average processing is performed on all symbols of an unmodulated signal and to calculate the frequency error only with the unmodulated signal symbols by detecting the position providing the maximum value after exceeding the threshold.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[First Embodiment]

Figure 9:
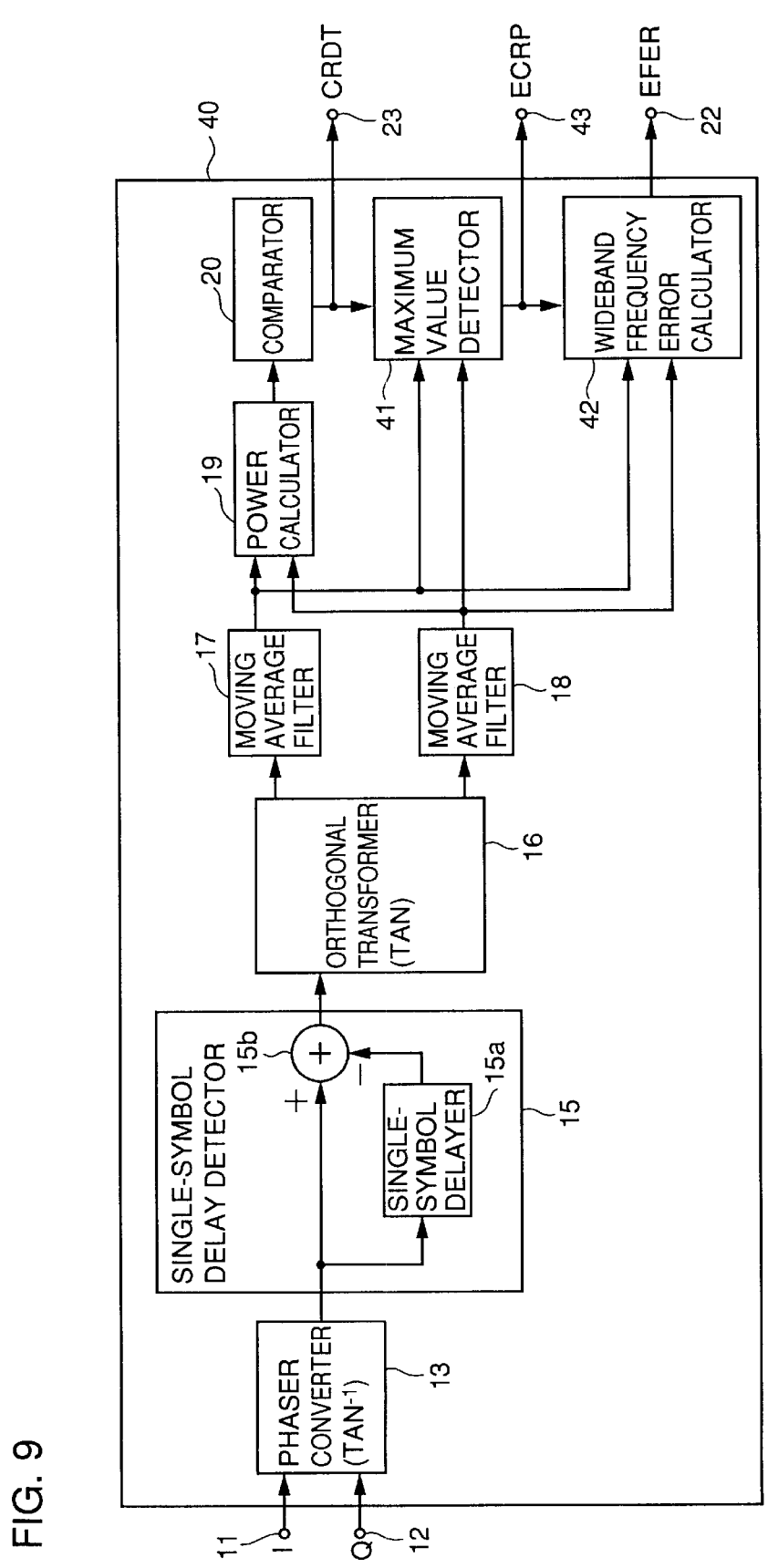
FIG. 9 schematically illustrates the overall structure of a frequency error estimator according to a first embodiment of the present invention.

FIG. 9 schematically illustrates the structure of a single-symbol delay detection frequency error estimator 40 according to a first embodiment of the present invention. Referring to FIG. 9, the single-symbol delay detection frequency error estimator 40 includes a phase converter 13 receiving an I-channel signal I and a Q-channel signal Q supplied to input terminals 11 and 12, performing arc tangent operation and obtaining phases, a single-symbol delay detector 15 performing a single-symbol delay operation in accordance with phase data output from phase converter 13 and detecting the current phase of a received signal, an orthogonal transformer 16 transforming phase information output from single-symbol delay detector 15 to I-channel data and Q-channel data, moving average filters 17 and 18 performing moving average processing on the I-channel data and the Q-channel data received from orthogonal transformer 16 respectively and outputting the I-channel data and the Q-channel data subjected to moving average processing, a power calculator 19 obtaining the square sum ($I^2+Q^2$) of the data from moving average filters 17 and 18, and a comparator 20 comparing power output from power calculator 19 with a prescribed threshold and asserting an unmodulated signal detection signal CRDT in accordance with the result of the comparison.

Figure 1:
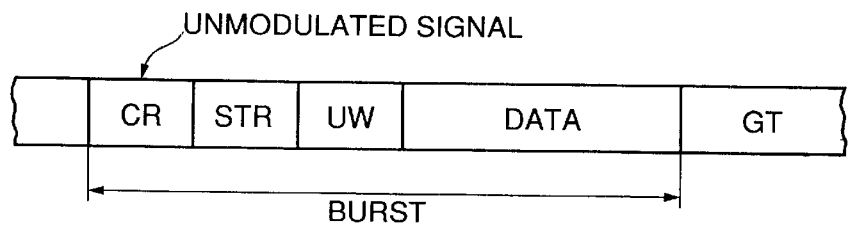
FIG. 1 schematically illustrates the structure a burst of a modulated signal to which the present invention is applied.
Figure 2:
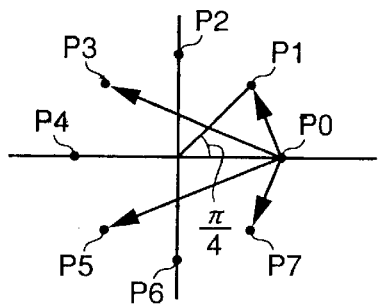
FIG. 2 schematically illustrates state arrangement and state shifting of a π/4 shift QPSK system.
Figure 4:
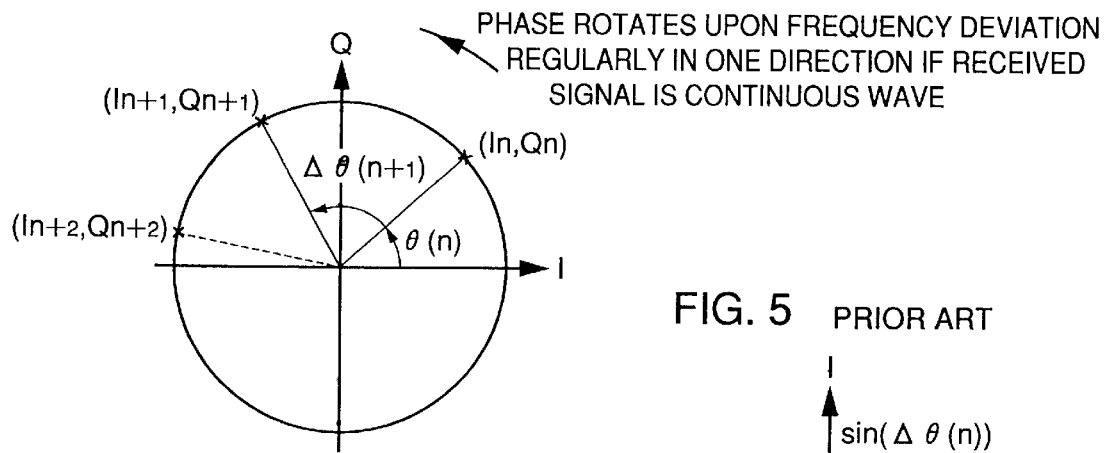
FIG. 4 illustrates the relation between the phases of received signals in a QPSK system.
Figure 5:
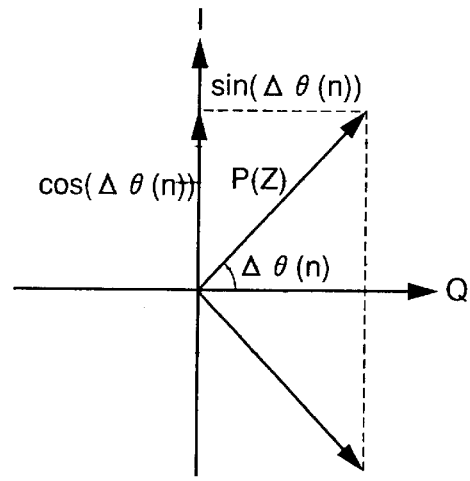
FIG. 5 illustrates the correspondence relationship between an input phase difference and output data in an orthogonal transformer shown in FIG. 3.
Figure 3:
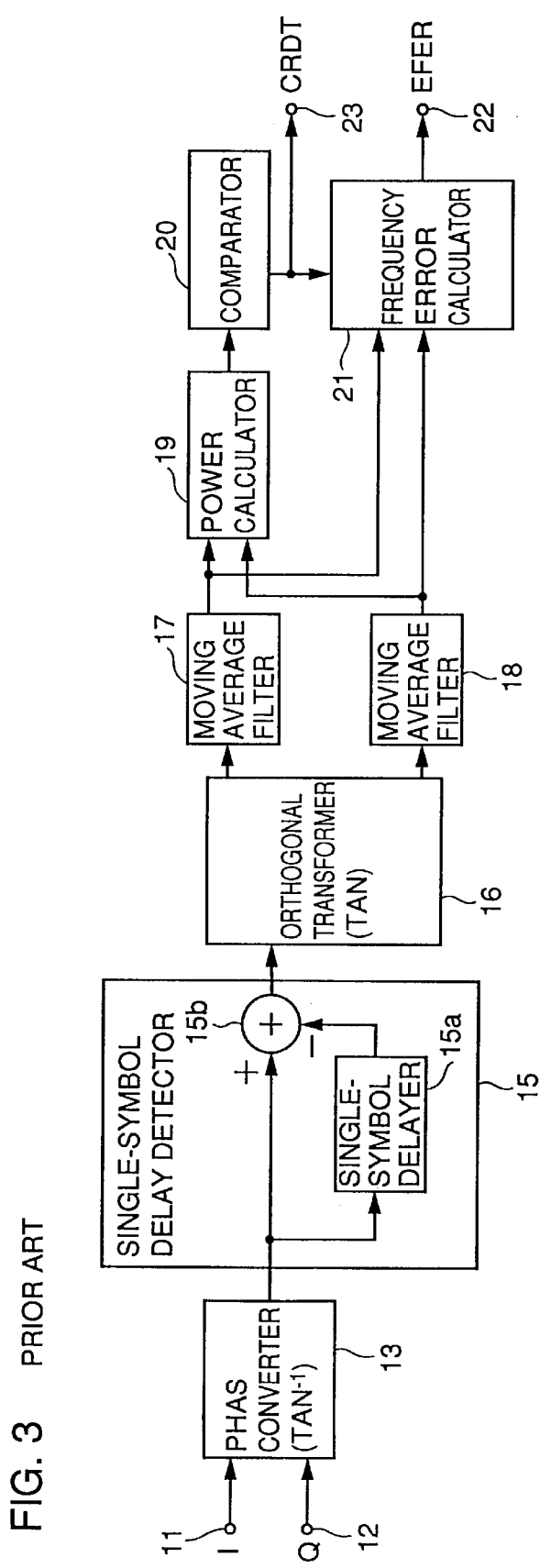
FIG. 3 schematically illustrates the structure of a conventional frequency error estimator.
Figure 6:
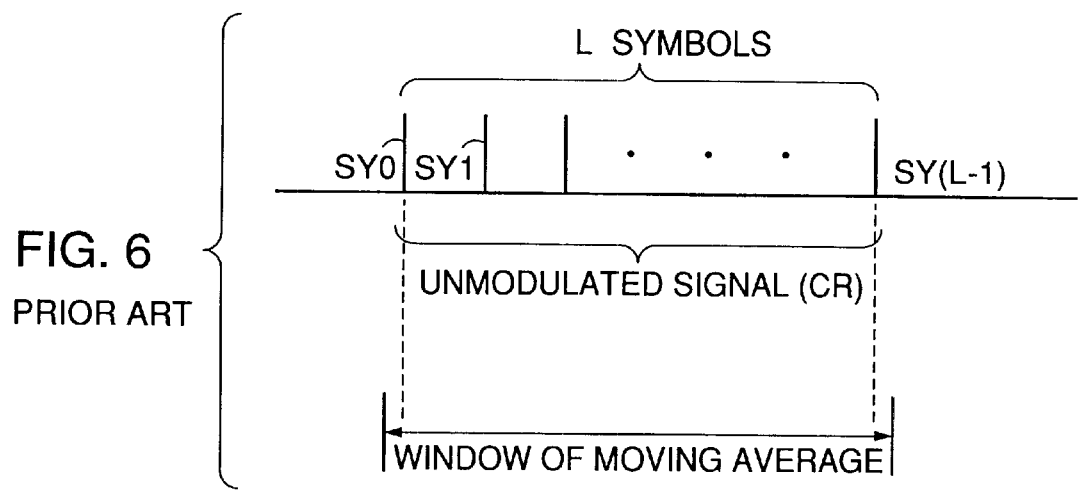
FIG. 6 schematically illustrates the correspondence relationship between an unmodulated signal interval and a window of a moving average filter.
Figure 7:
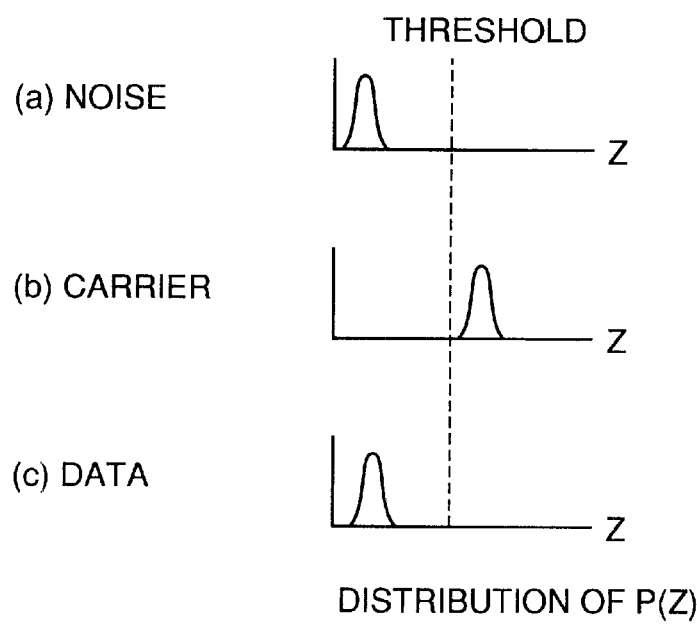
FIG. 7 schematically illustrates distribution of the power of received signal components.
Figure 8:
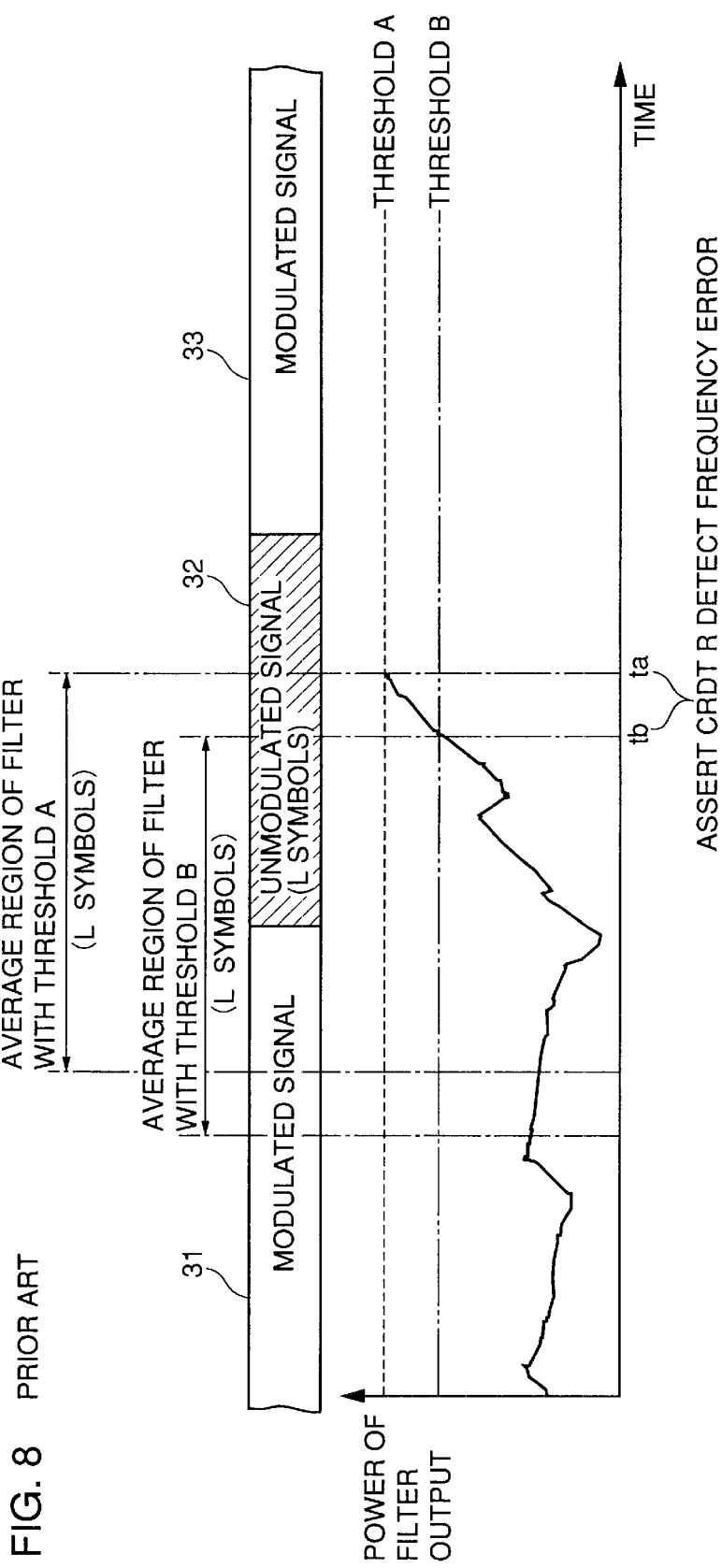
FIG. 8 is a diagram for illustrating operations of the frequency error estimator shown in FIG. 3.

Operations of the components from phase converter 13 to comparator 20 are identical to those of the components of the single-symbol delay detection frequency error estimator shown in FIG. 3, and hence detailed description is not repeated.

The frequency error estimator 40 further includes a maximum value detector 41 activated when the unmodulated signal detection signal CRDT from comparator 20 is activated (asserted) for detecting the maximum values of the power from moving average filters 17 and 18 over a prescribed time period, and a wideband frequency error calculator 42 activated in accordance with assertion of a maximum value detection signal ECRP from maximum value detector 41 for obtaining an average frequency error ΔF of one symbol in accordance with the outputs from moving average filters 17 and 18. The frequency range detectable by the single-symbol delay detection frequency error estimator 40 is –(Fs/2) to (Fs/2), with a band of a symbol rate Fs (Hz) about a carrier frequency.

Operations of the single-symbol delay detection frequency error estimator 40 shown in FIG. 9 are now described with reference to FIG. 10.

The phase converter 13 receives the I-channel signal and the Q-channel signal supplied through input terminals 11 and 12 in parallel and derives phase data. The phase converter 13 is formed by a memory table, for example, and outputs corresponding phase data with I-channel data and Q-channel data used as an address.

The single-symbol delay detector 15 obtains the difference between currently supplied phase data and phase data preceding by one symbol on the basis of the phase data from phase converter 13 and transmits differential data to orthogonal transformer 16. On the basis of this phase information, the orthogonal transformer 16 generates an I-channel component and a Q-channel component with reference to a table memory, for example. These components are expressed as cos($\phi$(n)) and sin($\phi$(n)) or cos(Δθ(n)) and sin(Δθ(n)) respectively.

The moving average filters 17 and 18 perform moving average processing on an L-symbol region. The power calculator 19 obtains the square sum of the I-channel component and the Q-channel component having high-frequency components eliminated, and received from moving average filters 17 and 18, to obtain average power P(z) of the input signal.

Figure 10:
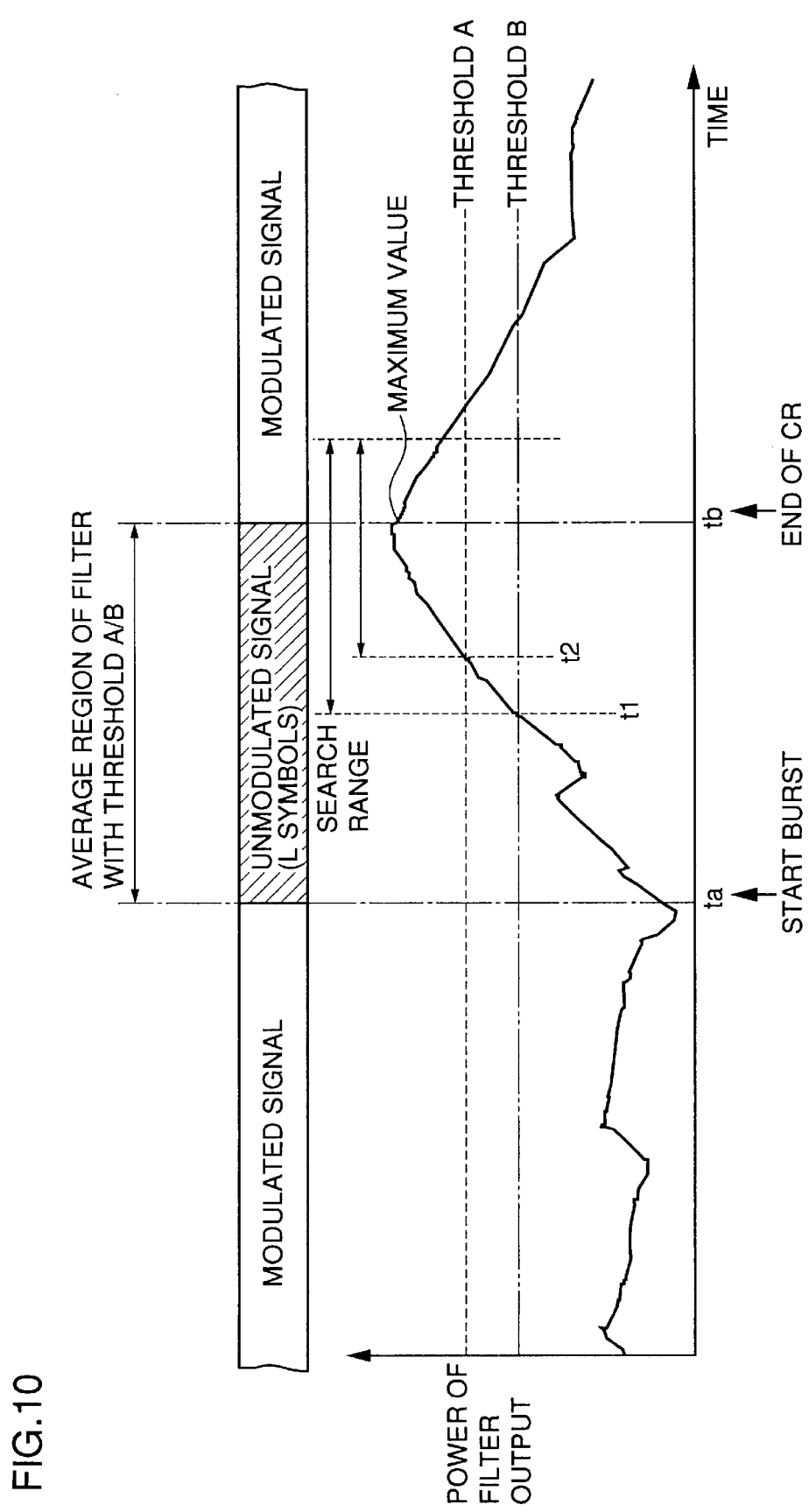
FIG. 10 illustrates operations of the frequency error estimator shown in FIG. 9.

When a burst starts at a time ta as shown in FIG. 10, the moving average filters 17 and 18 filter an unmodulated signal component and the power from the power calculator 19 starts to increase.

When a threshold A is set in comparator 20, the power output from power calculator 19 exceeds the threshold A at a time t2 and hence the comparator 20 asserts the unmodulated signal detection signal CRDT at the time t2. The maximum value detector 41 detects the maximum values of the power of the data output from moving average filters 17 and 18 in accordance with this assertion of the unmodulated signal detection signal CRDT from comparator 20. The maximum value detector 41 searches for the maximum values over a predetermined region (predetermined number of symbols). When all phases change in the same direction and the phase difference has the same code, the power is maximized. When the maximum value detector 41 detects the maximum values at a time tb, it is determined that moving average filters 17 and 18 obtain a moving average of the unmodulated signal of L symbols. In other words, it is determined that all unmodulated signal components arrive at the time tb and the maximum value detector 41 asserts an estimated unmodulated signal position indicating signal ECRP and outputs this signal from a terminal 43 at the time tb.

In accordance with this assertion of the estimated unmodulated signal position indicating signal ECRP from maximum value detector 41, the wideband frequency error calculator 42 calculates a frequency error in accordance with the filter data supplied from moving average filters 17 and 18. The wideband frequency error calculator 42 estimates the frequency error similarly to the frequency error calculator shown in FIG. 3, and the estimated average frequency error ΔF of one symbol is expressed as follows:

$$\Delta F = (Fs/2 \cdot \pi) \cdot \tan^{-1}(Qfout/Ifout)$$
$$= \Delta \theta / (2\pi \cdot T).$$

An estimated frequency error EFER from wideband frequency error calculator 42 is supplied to a voltage control oscillator through a terminal 22, so that the oscillation frequency of a local oscillator is adjusted.

When a threshold B is set in comparator 20, the unmodulated signal detection signal CRDT from comparator 20 is asserted at a time t1. The maximum value detector 41 detects the maximum values in response to the assertion of the unmodulated signal detection signal CRDT at the time t1. The maximum value detector 41 detects the maximum values at the time tb. Also when the comparator 20 has different levels of thresholds as the detection reference for the unmodulated signal, the estimated unmodulated signal position detection signal ECRP is asserted while moving average filters 17 and 18 store all L symbols included in the unmodulated signal. Therefore, the position of the unmodulated signal can be correctly identified regardless of the level of the threshold. The wideband frequency error estimator 42 estimates the frequency error with only the unmodulated signal and no modulated signal component is included when the frequency error is calculated, whereby the frequency error can be correctly estimated.

Referring to FIG. 9, the maximum value detector 41 detects the maximum values in accordance with the filter outputs Qfout and Ifout from moving average filters 17 and 18. Alternatively, the maximum detector 41 may detect the maximum values by receiving power information calculated in the power calculator 19.

Figure 11:
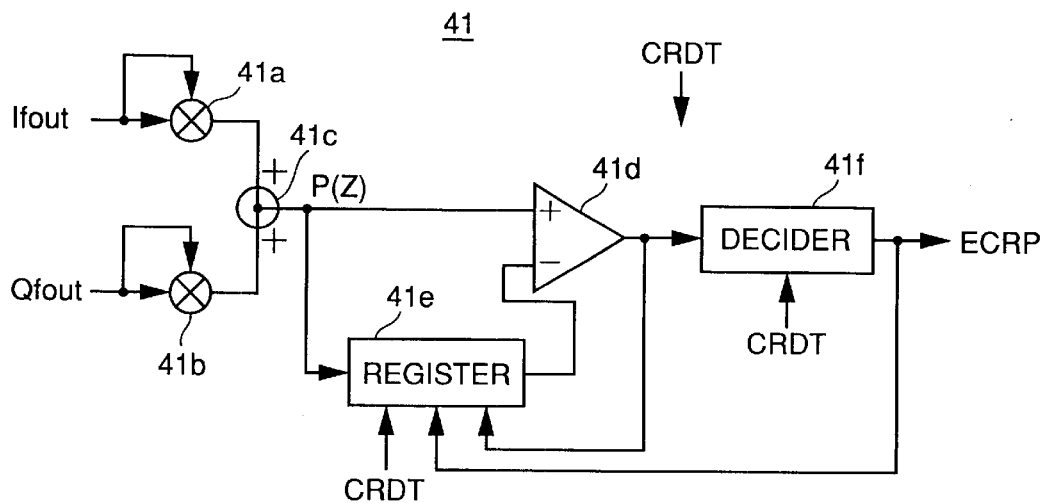
FIG. 11 illustrates an exemplary structure of a maximum value detector shown in FIG. 9.

FIG. 11 illustrates an exemplary structure of maximum value detector 41 shown in FIG. 9. Referring to FIG. 11, the maximum value detector 41 includes a multiplier 41a obtaining the square of the I-channel filter component Ifout, a multiplier 41b obtaining the square of the Q-channel filter component Qfout, an adder 41c adding up data output from multipliers 41a and 41b, a comparator 41d comparing power B of adder 41c with power stored in a register 41e, and a decider 41f receiving an output signal from comparator 41d and asserting the maximum value detection signal (estimated unmodulated signal position indicating signal) ECRP on the basis of a prescribed rule.

The register 41e resets stored data when the unmodulated signal detection signal CRDT from comparator 20 shown in FIG. 9 is asserted, rewrites the storage contents thereof with the power data P(z) supplied from adder 41c when the output signal from comparator 41d is high, and completes the storage operation when the estimated unmodulated signal position indicating signal ECRP from decider 41f is asserted. The comparator 41d and decider 41f are activated when the unmodulated signal detection signal CRDT is asserted while held in inactive states in a normal state.

Figure 12:
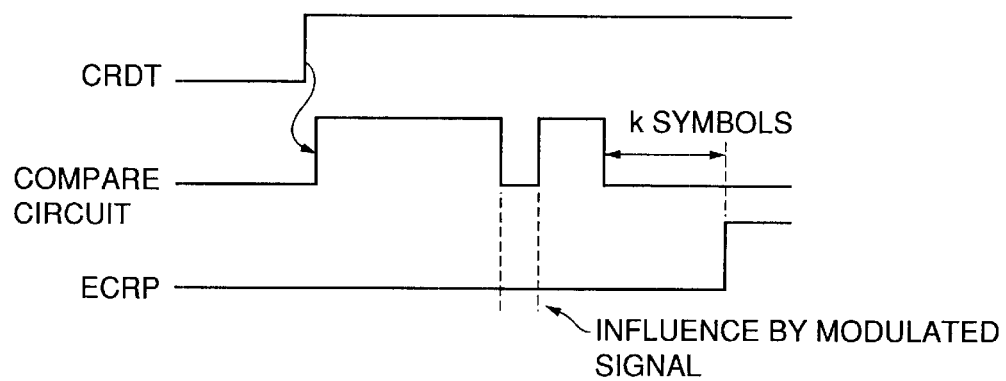
FIG. 12 is a signal waveform diagram representing operations of the maximum value detector shown in FIG. 9.

Operations of the maximum value detector 41 shown in FIG. 11 are described with reference to a signal waveform diagram shown in FIG. 12.

When the unmodulated signal detection signal CRDT from comparator 20 is asserted, the comparator 41d performs comparison. Stored data of register 41e is reset to an initial value (minimum power value). The multipliers 41a and 41b obtain the squares of the I-channel filter component Ifout and the Q-channel filter component Qfout and supply the squares to adder 41c. At first, therefore, the power P(z) is greater than the data stored in register 41e and hence the output signal of comparator 41d goes high. In response to the high level (assertion) of the output signal from comparator 41d, the register 41e stores the power data P(z) supplied from adder 41c. The decider 41f monitors the change of the output signal from the comparator 41d from assertion to deassertion.

When the power of the filter outputs lowers due to influence by a modulated signal component after exceeding the threshold, the output signal of comparator 41d is asserted and the stored data in register 41e remains unchanged. At this time, the decider 41f detects that the output signal of comparator 41d changes from assertion to deassertion and determines whether or not the deasserted state of the output signal from comparator 41d is sustained for a prescribed symbol period (k symbol periods). This k symbol periods are readily detected by a counter activated in response to the change of the output signal from comparator 41d from assertion to deassertion for performing counting, for example. In this change of the output signal from comparator 41d from assertion to deassertion due to influence by the modulated signal, the output signal of comparator 41d is then asserted again. The decider 41f resets interval counting in response to change from deassertion to assertion.

Upon reaching the maximum value, the register 41e stores data indicating the maximum power P(z) in accordance with the output signal from comparator 41d. Next power is smaller than this maximum value, and hence the output signal from comparator 41d is thereafter deasserted and the stored data of register 41e is not updated. The decider 41f determines whether or not the deasserted state is sustained for the k symbol periods in response to the change of the output signal from comparator 41d from assertion to deassertion. When the deasserted state is sustained for the k symbol periods, the decider 41f determines that the value preceding by k symbols (samples) is the maximum value and asserts the maximum value detection signal (estimated unmodulated signal position instruction signal) ECRP.

The k symbol (sample) periods are previously determined and hence it is possible to determine that all unmodulated signal components are supplied in advance of the k symbol (sample) periods although detection of the maximum value is delayed by the k symbol (sample) periods from actual maximum value detection, and symbol synchronization and establishment of burst synchronization employing a unique word and the like can be implemented in each circuit.

Figure 13:
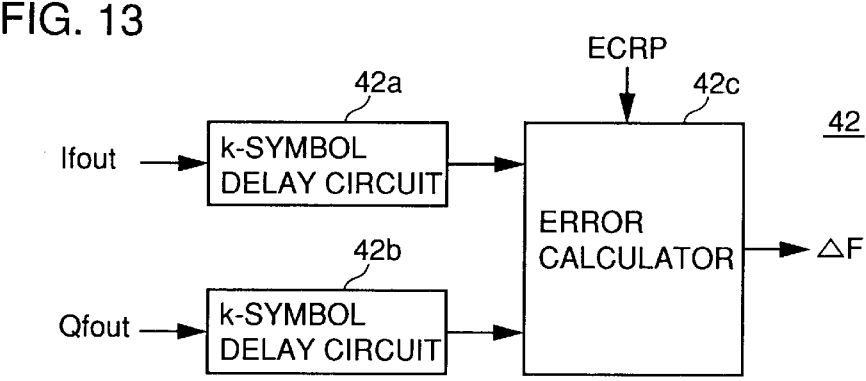
FIG. 13 illustrates an exemplary structure of a frequency error calculator shown FIG. 9.

FIG. 13 illustrates an exemplary structure of the wideband frequency error calculator 42 shown in FIG. 9. Referring to FIG. 13, the wideband frequency error calculator 42 includes a k-symbol delay circuit 42a delaying the I-channel filter component Ifout by k symbol periods, a k-symbol delay circuit 42b delaying the Q-channel filter component Fout by k symbol periods, and an error calculator 42c calculating the frequency error $\Delta F$ in accordance with output signals from k-symbol delay circuits 42a and 42b when the maximum value detection signal ECRP is asserted.

When the maximum value detection signal (estimated unmodulated signal position instruction signal) ECRP is asserted from the decider 41f shown in FIG. 11, the k-symbol delay circuits 42a and 42b output filter. components corresponding to the maximum values so that the error calculator 42c can correctly calculate the frequency error $\Delta F$ with the signal components providing the maximum values.

In the structure shown in FIG. 11, the squares of the I-channel filter component Ifout and the Q-channel filter component Qfout are obtained for calculating the power. Alternatively, the maximum value detector 41 may be directly supplied with the power P(z) from power calculator 19. In this case, the circuit structure can be simplified.

Figure 14:
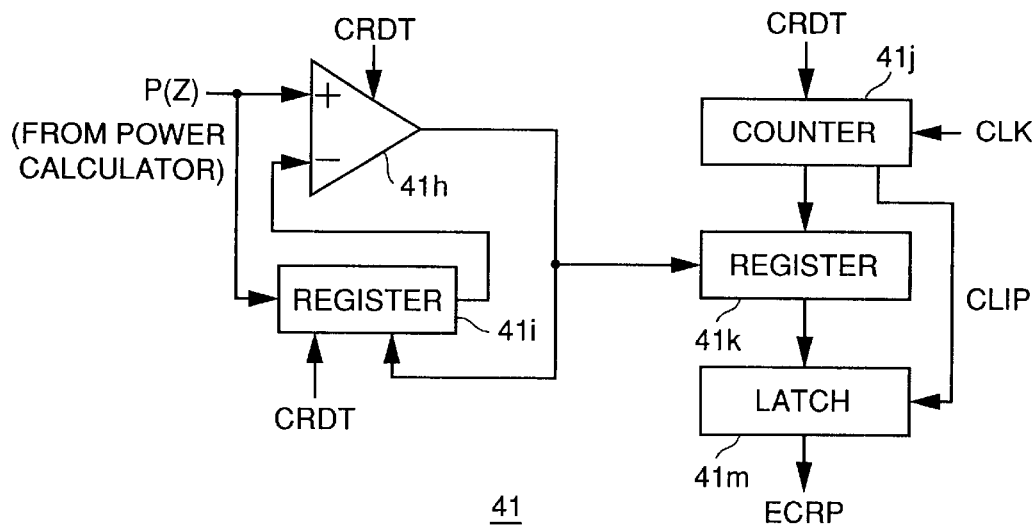
FIG. 14 illustrates a modification of the maximum value detector shown in FIG. 9.

FIG. 14 illustrates a modification of the maximum value detector 41 shown in FIG. 9. Referring to FIG. 14, the maximum value detector 41 includes a comparator 41h comparing the power P(z) from the power calculator 19 with power data stored in a register 41i, a counter 41j counting a clock signal CLK when the unmodulated signal detection signal CRDT is asserted, a register 41k capturing and latching the count value of counter 41j when an output signal of the comparator 41h is asserted, and a latch 41m latching the count value stored in register 41k in accordance with a count-up indicating signal CUP from counter 41j and outputting the count value as the estimated unmodulated signal position instruction signal ECRP.

The storage contents of register 41i are reset when the unmodulated signal detection signal CRDT is asserted. The clock signal CLK is in phase with a carrier having the same frequency as the symbol rate.

In the maximum value detector 41 shown in FIG. 14, the comparator 41h performs comparison when the power P(z) exceeds the threshold, and the register 41k stores the count value of counter 41j every time the register 41i stores new power data P(z). After completion of a prescribed counting period of counter 41j, therefore, the register 41k stores data indicating the number of a symbol (sample) having the maximum value in a prescribed time period from assertion of the unmodulated signal detection signal CRDT. It is possible to identify how many cycles have elapsed after assertion of the unmodulated signal detection signal CRDT before the symbol having the maximum value is supplied, i.e., whether or not the moving average filters 17 and 18 store all unmodulated signal components by outputting the symbol (sample) position information through latch 41*m*. Also in this case, therefore, the unmodulated signal position can be estimated by combining the unmodulated signal detection signal CRDT with the count value output from latch 41*m*.

In other words, it is possible to identify how many sample cycles precede the count-up time of the counter 41*i* before the moving average filters 17 and 18 store all unmodulated signal components. The unmodulated signal position may be estimated through this structure. In this case, however, processing of the input signal must be delayed up to a lapse of a prescribed period counted by the counter through a buffer memory or the like.

According to the first embodiment of the present invention, as hereinabove described, the maximum value is searched for over a prescribed time period after the power of the received signal exceeds the prescribed threshold in the comparator for estimating the point of time when the maximum value is detected as the unmodulated signal position, whereby the unmodulated signal position can be correctly identified for correctly generating the carrier, establishing synchronization of subsequent bursts and recovering data. The frequency error is calculated on the basis of demodulated signal components of the input signal at the point of time of maximum value detection, whereby the frequency error can be correctly calculated with the unmodulated signal components, thereby improving frequency error detection precision.

[Second Embodiment]

Figure 15:
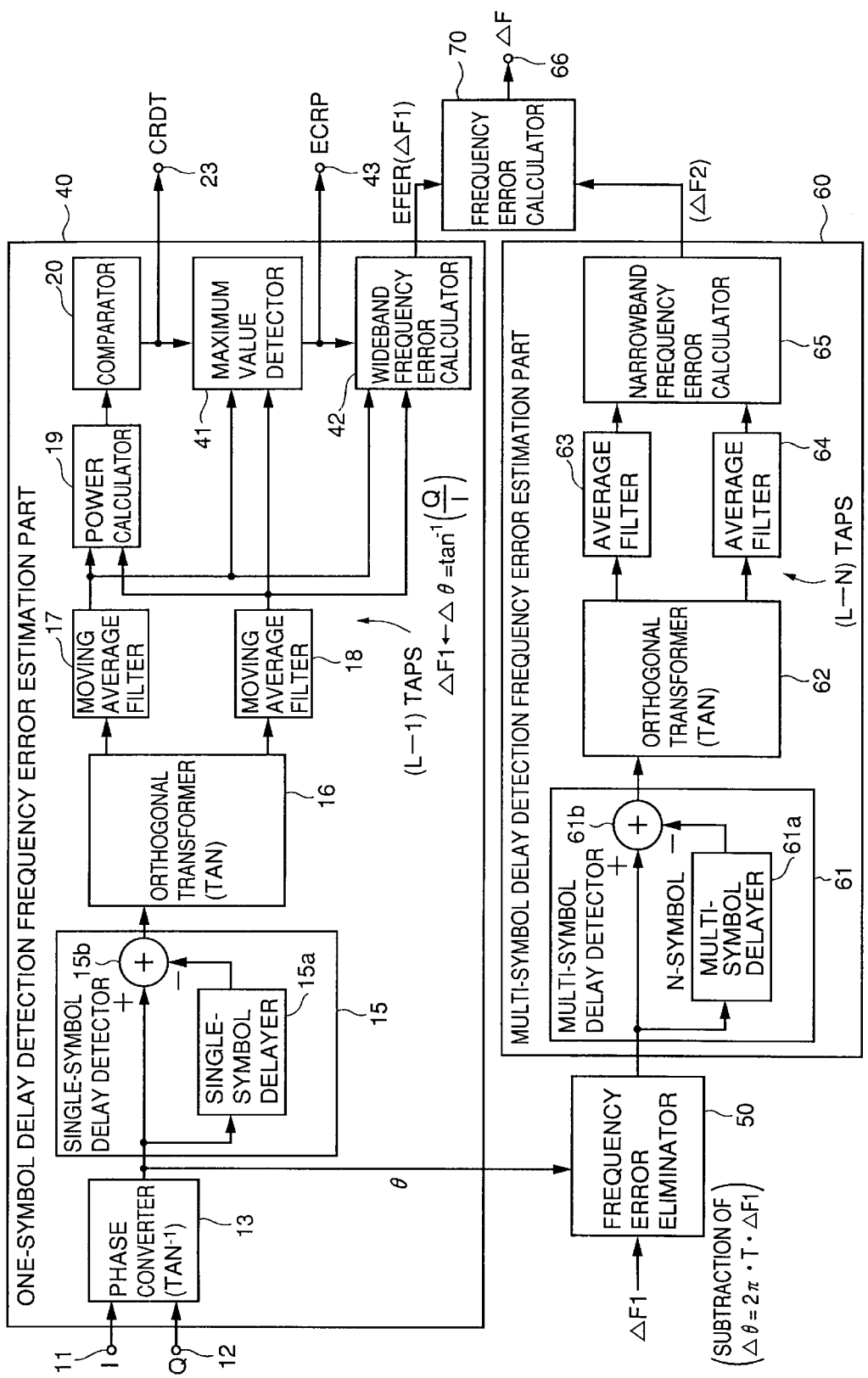
FIG. 15 schematically illustrates the overall structure of a frequency error estimator according to a second embodiment of the present invention.

FIG. 15 schematically illustrates the structure of a frequency error estimator according to a second embodiment of the present invention. The frequency error estimator shown in FIG. 15 includes a single-symbol delay detection frequency error estimator 40 identical to that described with reference to the first embodiment, a frequency error eliminator 50 eliminating a frequency error ΔF1 estimated by the single-symbol delay detection frequency error estimator 40 from phase data output from a phase converter 13 included in the single-symbol delay detection frequency error estimator 40, and a multi-symbol delay detection frequency error estimator 60 calculating a frequency error ΔF2 of a narrow band in accordance with phase data output from frequency error eliminator 50.

The multi-symbol delay detection frequency error estimator 60 includes a multi-symbol delay detector 61 receiving phase information from frequency error eliminator 50 and performing multi-symbol delay detection, an orthogonal transformer 62 performing an orthogonal transformation on phase difference information from multi-symbol delay detector 61 and generating an I-channel component and a Q-channel component, average filters 63 and 64 averaging the I-channel components and the Q-channel components received from orthogonal transformer 62 respectively, a narrowband frequency error calculator 65 calculating the estimated frequency error ΔF2 in accordance with output data from average filters 63 and 64, and a frequency error calculator 70 calculating an estimated frequency error ΔF in accordance with the estimated frequency errors ΔF1 and ΔF2 output from the single-symbol delay detection frequency error estimator 40 and the narrowband frequency error calculator 65 and outputting the estimated frequency error ΔF to a terminal 66.

The frequency error eliminator 50 eliminates a phase component corresponding to the estimated frequency error ΔF1 calculated by the wideband frequency error calculator 42 from the phase data received from the phase converter 13. In other words, the frequency error eliminator 50 executes the following processing:

In the phase converter 13, an error is caused by 2π·ΔF·t in the phase due to the frequency error ΔF. The frequency error eliminator 50 receives phase data Δθ, i.e., 2π·ΔF·T corresponding to the estimated frequency error ΔF1 from wideband frequency error calculator 42 and substrates the same from phase data θ received from phase converter 13. In other words, the frequency error eliminator 50 generates phase data θ(n)−Δθ(n) corresponding to 2π·(ΔF−ΔF1)·t. The wideband frequency error calculator 42 generates a corresponding one-symbol average phase difference Δθ when the estimated frequency error ΔF1 is generated.

The multi-symbol delay detector 61 includes a multi-symbol delayer 61*a* delaying the phase data from frequency error eliminator 50 by a plurality of symbols and an adder 61*b* subtracting phase data output from multi-symbol delayer 61*a* from the phase data received from frequency error eliminator 50. When delaying the phase data by N symbols, therefore, the multi-symbol delay detector 61 outputs the following phase data:

$$\{\theta(n)-\Delta\theta(n)\}-\{\theta(n-N)-\Delta\theta(n-N)\}.=2\pi(\Delta F-\Delta F1)\cdot t-2\pi(\Delta F-\Delta F1)(t-NT)=2\pi\cdot N\cdot T(\Delta F-\Delta F1)=\Delta\phi,$$

where T represents a symbol period satisfying the relation T=1/Fs.

The orthogonal transformer 61 performs tangent operation on the basis of the phase data Δϕ from multi-symbol delay detector 61, to generate the I-channel component and the Q-channel component.

Only unmodulated signal components are described here for simplifying the description. In a modulated signal part, a phase component ϕ(t) of an actual modulated signal is included in the phase data output from multi-symbol delay detector 61 (ϕ(t)−ϕ(t−N·T)). This is already included in the phase difference component.

When the unmodulated signal part has L symbols, the average filters 63 and 64 have (L−N) taps. Therefore, the average filters 63 and 64 perform moving average processing using (L−N+1) symbols.

The narrowband frequency error calculator 65 performs frequency error estimation with the wideband frequency error calculator 42 and estimates the frequency error ΔF2 on the basis of the filter components output from the average filters 63 and 64. The average frequency error ΔF2 of one symbol estimated by the narrowband frequency error calculator 65 is expressed as follows:

$$\Delta F2 = \Delta F - \Delta F1$$
$$= (1/2\pi \cdot N \cdot T) \cdot \tan^{-1}(Qft/Ift),$$

where Qft and Ift represent the Q-channel filter component and the I-channel filter component output from average filters 63 and 64, respectively. The above equation is expressed with the symbol rate Fs as follows:

$$\Delta F2=(Fs/(2\pi\cdot N))\cdot\tan^{-1}(Qft/Ift).$$

The frequency error calculator 70 generates the frequency error ΔF by adding up the frequency error ΔF2 calculated by narrowband frequency error calculator 65 and the frequency error ΔF1 calculated in wideband frequency error calculator 42 and outputs the same through terminal 66. In maximum value detection, the average filters 63 and 64 store unmodulated signal components (L symbols) and obtain moving averages of (L−N+1) symbols.

The multi-symbol delay detection frequency error estimator 60 performs N-symbol delaying and the number of phase states equivalently increases to N. Therefore, the detectable frequency range is −(Fs/2·N) to (Fs/2·N), which is narrower than the frequency range detectable by the single-symbol delay detection frequency error estimator 40.

Also when combining the single-symbol delay detection frequency error estimator 40 and the multi-symbol delay detection frequency error estimator 60 shown in FIG. 15 with each other, the frequency error ΔF can be correctly calculated only with unmodulated signal components. The single-symbol delay detection frequency error estimator 40 detects the maximum value in accordance with the output signal from comparator 20, and hence the position of an unmodulated signal area (carrier recovery code CR) can be identified in accordance with a maximum value detection signal or estimated unmodulated signal position information ECRP from maximum value detector 41.

Also when the narrowband frequency error calculator 65 calculates the frequency error, the average filters 63 and 64 employ only unmodulated signal components. The average filters 63 and 64 perform averaging with (L−N+1) unmodulated signal components excluding preceding N unmodulated signal components.

Figure 16:
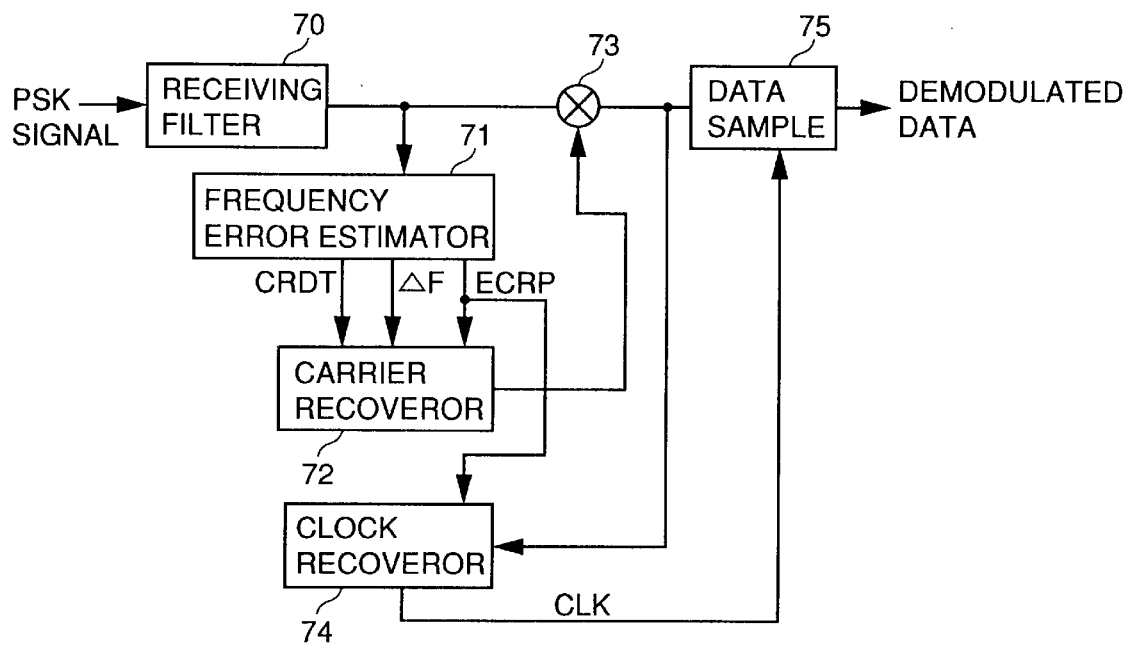
FIG. 16 schematically illustrates the overall structure of a PSK signal demodulator according to the present invention.

FIG. 16 schematically illustrates the structure of a demodulator according to the present invention. Referring to FIG. 16, the demodulator includes a receiving filter 70 receiving a PSK signal and eliminating a harmonic component, a frequency error estimator 71 separating the PSK signal received from receiving filter 70 into I-channel data and Q-channel data and estimating a frequency error, a carrier regenerator 72 receiving an unmodulated signal detection signal CRDT, estimated unmodulated signal position information ECRP and an estimated frequency error ΔF from frequency error estimator 71 and recovering a carrier, a multiplier 73 multiplying the recovered carrier from carrier recoveror 72 by the PSK signal from receiving filter 70 for performing balanced modulation, a clock recoveror 74 recovering a clock signal CLK necessary for synchronization establishment and internal synchronization with a symbol recovering code STR and a unique word UW in accordance with a demodulated signal from multiplier 73 and the estimated unmodulated signal position information ECRP from frequency error estimator 71, and a data sampler 75 sampling the demodulated signal from multiplier 73 in accordance with the clock signal CLK from clock recoveror 74 for generating demodulated data.

The frequency error estimator 71 is the device shown in the first or second embodiment of the present invention. The carrier can be correctly recovered with an unmodulated signal part by detecting the unmodulated signal position in frequency error estimator 71 and supplying the same to carrier recoveror 72 with the estimated frequency error Δ F. The clock recoveror 74 utilizing the unmodulated signal position information ECRP can correctly recover the clock signal by detecting the position of the unique word UW from symbol timing recovering code STR for sampling data. The clock recoveror 74 may alternatively receive the signal from receiving filter 70 for recovering the clock signal before recovering the carrier.

The above description is made with reference to the π/4 shift QPSK modulation system, for example. However, the present invention is also applicable to another modulation system so far as the same is a PSK modulation system. In addition, the communication terminal according to the present invention is applicable to all communication systems performing burst operations with unmodulated signals included in the bursts for recovering carriers.

[Exemplary Application of the Invention]

The communication terminal according to the present invention is applicable to a general portable telephone and terminals of digital mobile communication and satellite communication. While an error is caused in a carrier frequency by a Doppler effect, drift of a local oscillator provided on a base station or a satellite of a sending side or residual of automatic frequency control particularly in satellite communication, the carrier frequency error can be sufficiently suppressed by the present invention for correctly receiving data.

Effects of the Invention

According to the present invention, as hereinabove described, the maximum value is detected over a predetermined region after the power of an input signal component exceeds a predetermined threshold, whereby the position of an unmodulated signal can be specified, and a frequency error can be calculated through use of only the unmodulated signal by calculating the frequency error on the basis of the specified position, for improving estimation precision for the frequency error and readily identifying the position of starting a subsequent burst and the position of data to be demodulated by estimating the position of the unmodulated signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication terminal having a function of detecting an error in a frequency of a carrier of a received signal, comprising:

power derivation means for deriving power of said received signal;

compare means for comparing said power derived by said power derivation means with a predetermined threshold and outputting a detection signal activated when the derived power exceeds said threshold;

maximum value detection means for detecting a maximum value of said power derived by said power derivation means in response to activation of said detection signal from said compare means; and frequency error calculation means for obtaining said error in the frequency of said carrier by performing prescribed arithmetic processing on the received signal having the power of the maximum value in response to a maximum value detection signal from said maximum value detection means.

2. The communication terminal according to claim 1, wherein said power derivation means includes:

phase detection means for obtaining a phase of said received signal, component calculation means for obtaining a component of said received signal from the phase detected by said phase detection means, and a power calculator for calculating said power in accordance with said component calculated by said component calculation means.

3. The communication terminal according to claim 2, wherein said phase detection means includes means for performing single-symbol delay detection using a received signal and a received signal preceding said received signal by one symbol.

4. The communication terminal according to claim 2, wherein said phase detection means includes:
- a phase extractor for extracting phase information of said received signal,
- a one-symbol delayer for delaying said phase information extracted by said phase extractor by one symbol period, and
- phase combining means for combining output information from said one-symbol delayer and said phase information extracted by said phase extractor.

5. The communication terminal according to claim 4, wherein said phase combining means includes a subtracter for obtaining a difference between said phase information extracted by said phase extractor and said phase information output by said one-symbol delayer.

6. The communication terminal according to claim 2, wherein said received signal is a quadrature modulation signal having an I-channel component and a Q-channel component, and
said phase detection means includes:
- a phase converter for performing arc tangent operation on said I-channel component and said Q-channel component and extracting phase information,
- a one-symbol delayer for delaying said phase information output from said phase converter by one symbol period, and
- a subtracter for subtracting phase information output from said one-symbol delayer from information output from said phase converter.

7. The communication terminal according to claim 2, wherein said received signal is a quadrature modulation signal having an I-channel component and a Q-channel component, and
said component calculation means includes:
- an orthogonal transformer for obtaining said I-channel component and said Q-channel component in accordance with phase information from said phase detection means, and
- an average filter for obtaining an average value of each of said I-channel component and said Q-channel component from said orthogonal transformer.

8. The communication terminal according to claim 1, wherein said maximum value detection signal from said maximum value detection means also indicates a position of an unmodulated signal included in said received signal.

9. The communication terminal according to claim 1, wherein said frequency error calculation means includes:
- a wideband frequency error calculator for calculating a first error of the frequency of said carrier of said received signal in response to said maximum value detection signal,
- a frequency error eliminator for eliminating a component corresponding to said first error from a component of said received signal,
- a frequency error estimation part for performing a prescribed processing on information output from said frequency error eliminator and obtaining a second error of the frequency of said carrier, and
- a final error calculator receiving the first and second errors and calculating a final error of the frequency of said carrier.

10. The communication terminal according to claim 9, wherein said power derivation means includes
- a phase converter for obtaining a phase component of said received signal, and
said frequency error eliminator includes
- a circuit for eliminating a phase value corresponding to said first error from said phase information from said phase converter.

11. The communication terminal according to claim 9, wherein said frequency error estimation part includes:
- a multi-symbol delay detector for performing multi-symbol delay detection on information output from said frequency error eliminator, and
- a second error derivation part for deriving said second error in accordance with information output from said multi-symbol delay detector.

12. The communication terminal according to claim 9, wherein said received signal is a quadrature modulation signal having an I-channel component and a Q-channel component,
said power derivation means includes
- a phase converter for obtaining a phase component of said received signal from said I-channel component and said Q-channel component,
said frequency error eliminator includes means for subtracting a phase component corresponding to said first error from said phase component from said phase converter, and
said frequency error estimation part includes:
- a multi-symbol delayer for delaying phase information from said frequency error eliminator by a plurality of symbol periods,
- a subtracter for subtracting the phase information output from said multi-symbol delayer from phase information from said frequency error eliminator,
- an orthogonal transformer for calculating said I-channel component and said Q-channel component in accordance with information output from said subtracter,
- an average filter for obtaining an-t-he-average value of each of said I-channel component and said Q channel component from said orthogonal transformer over a plurality of symbol periods, and
- a narrowband frequency error calculator for calculating said second error in accordance with information output from said average filter.

* * * * *